United States Patent [19]

Grimsby

[11] Patent Number: 4,528,741
[45] Date of Patent: Jul. 16, 1985

[54] DEVICE FOR STRIPPING INSULATION FROM A WIRE

[75] Inventor: Emerson A. Grimsby, Brea, Calif.

[73] Assignee: International Telephone & Telegraph Corporation, New York, N.Y.

[21] Appl. No.: 457,989

[22] Filed: Jan. 14, 1983

[51] Int. Cl.³ .............................................. H02G 1/12
[52] U.S. Cl. .................. 29/564.4; 29/566.4; 81/9.51
[58] Field of Search ............... 29/566.4, 564.4; 81/9.5 R, 9.51, 9.5 A, 9.5 B

[56] References Cited

U.S. PATENT DOCUMENTS

| | | | |
|---|---|---|---|
| Re. 30,342 | 11/1980 | Perrino | 81/9.51 |
| 1,857,731 | 5/1932 | Lund | 81/9.51 |
| 2,480,107 | 8/1949 | Baldwin et al. | 81/9.5 A |
| 3,002,408 | 10/1961 | Schwalm et al. | 81/9.51 |
| 3,176,550 | 4/1965 | Marcotte | 81/9.51 |
| 3,527,124 | 9/1970 | Ullman | 81/9.51 |
| 3,541,896 | 11/1970 | Watson | 81/9.51 |
| 3,727,492 | 4/1973 | Zanni | 81/9.5 A |
| 3,748,932 | 7/1973 | Neiman et al. | 81/9.51 |
| 4,084,310 | 4/1978 | Dragsic | 81/9.51 |
| 4,092,880 | 6/1978 | Kaufmann | 81/9.5 R |
| 4,117,749 | 10/1978 | Economu | 81/9.5 R |

Primary Examiner—William R. Briggs
Assistant Examiner—Glenn L. Webb
Attorney, Agent, or Firm—T. L. Peterson; R. C. Turner

[57] ABSTRACT

A device is disclosed for stripping insulation from the end of an insulated wire. Four identical insulation blades are provided. One pair of blades is mounted on one pivotable arm while a second pair of blades is mounted on a second pivotable arm. The blades on each arm are inverted relative to each other so that the beveled surfaces of the blades which form the cutting edges face in opposite directions, and the beveled surfaces of the blades of the respective pairs which face in the same direction are opposite to each other. This arrangement provides a balanced pattern of the cutting edges and therefore uniform cutting action on the insulation so that when the insulation is removed from the end of the wire, wire skiving is avoided.

13 Claims, 7 Drawing Figures

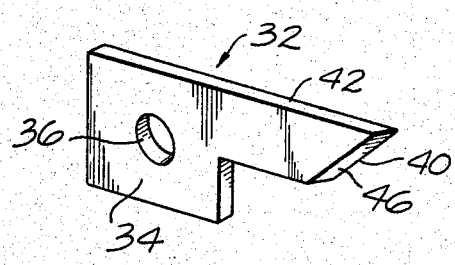
FIG. 3
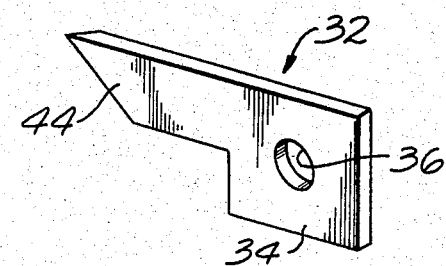
FIG. 4
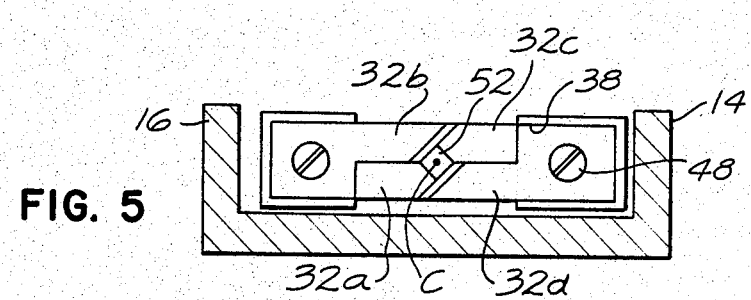
FIG. 5
FIG. 6
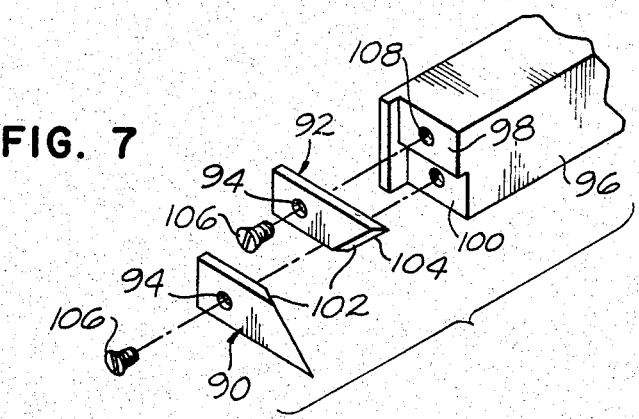
FIG. 7

DEVICE FOR STRIPPING INSULATION FROM A WIRE

BACKGROUND OF THE INVENTION

The present invention relates to a device for removing insulation from the end of an insulated electrical wire and, more particularly, to such a device which allows the insulation to be removed from the wire without skiving of the wire.

In a typical insulation stripping apparatus such as disclosed in U.S. Pat. No. 3,893,776 to Anderson, et al., assigned to the assignee of the present application, there are provided two stripper blades, one of which is fixed and the other movable. In the Anderson apparatus, the movable blade is pivotably mounted. Each blade has a V-shaped notch therein facing the notch of the other blade. One surface of each blade adjacent to the notch is flat while the other surface is formed with a bevel. The beveled surfaces on the respective blades face in opposite directions. As a result, it is possible that when the insulation is stripped from a wire inserted into the opening defined by the V-shaped notches, the wire will skive or bend due to the unbalanced forces acting on the opposite sides of the wire. A bent wire prevents proper positioning of the wire in a contact crimp barrel so that it is possible that the barrel may not be properly crimped upon the end of the wire. Thus, one object of the present invention is to provide a stripper blade assembly for an insulation stripping device in which the beveled edges of the stripper blades are balanced so that a uniform cutting action is produced on the insulation whereby the wire will not skive when the insulation is removed therefrom.

Typically, the cutting edges of the V-shaped notch in the cutting blade of a conventional insulation stripper form a right angle so that the opening formed by the notches in the blades into which the wire is inserted for stripping has a square shape. If one of the blades is carried by a pivoted arm, and the other blade is fixed, the movable blade will move through an arc. As a result, when the size of the opening is altered by adjusting one of the blades, the configuration of the opening may become non-uniform, rather than form a square, which will result in further unbalanced forces acting upon the insulation on the wire by the blades. Furthermore, with one blade fixed and the other movable, the center of the opening defined by the notches in the blades will change if the size of the opening is altered by adjusting one of the blades so that when a wire is inserted through a central guide hole in front of the blade assembly, the wire may not necessarily lie in the center of the opening formed by the notches in the blades, further leading to unbalanced forces being applied to the opposite sides of the insulation on the wire. It is another object of the present invention to overcome the foregoing problem by assuring that the wire receiving opening defined by the blades is always square, and the center point of the opening remains constant regardless of adjustments being made to the blades to alter the size of the wire receiving opening to accommodate different sized wires.

As will be seen from the following description, the stripping device of the present invention utilizes four insulation cutting blades. The use of more than two cutting blades in a wire stripping machine is not by itself novel. For example, the following United States patents disclose wire stripping machines utilizing either three or four blades. U.S. Pat. Nos. 2,239,755; 2,703,026; 4,116,092 and 4,327,609. The latter patent discloses a wire stripping machine incorporating two pairs of insulation cutting blades, with one pair of opposed blades overlapping the other pair adjacent to their cutting edges. The blades are attached by screws to internal and external cylinders so that when one cylinder is rotated relative to the other, the cutting edges of the blades move inwardly to cut the insulation on the wire inserted between the inner ends of the blades.

SUMMARY OF THE INVENTION

According to one aspect of the present invention, there is provided a device for the stripping of insulation from a wire in which four insulation cutting blades are provided, one pair of which are mounted on one arm of the device and the other pair mounted on a second arm of the device which is movable toward and away from the first arm. Each blade has an angular cutting edge defined by a flat surface and a beveled surface intersecting the flat surface. The angular cutting edges of the blades of each pair on an arm form a V-shaped notch. The V-shaped notches of the two pairs of blades face each other to form a wire receiving opening. The blades of each pair on an arm are reversed relative to each other so that the flat surfaces of all the blades lie in a common plane. The beveled surfaces of the first and third blades on the respective arms which are opposite to each other both face in one direction relative to the plane while the beveled surfaces of the second and fourth blades which are opposite to each other face in the opposite direction relative to the plane. By this arrangement, equal cutting surfaces are provided on the opposite sides of a wire inserted into the wire receiving opening defined between the blades so that equal cutting forces are applied to the opposite sides of the insulated wire whereby a uniform cutting action is achieved which prevents skiving of the wire when the insulation on the end of the wire is stripped from the wire by the blades.

According to another aspect of the present invention, the blade carrying arms of the device are pivotable about parallel pivot pins, and inward extensions on the arms are interconnected in such a fashion so that the center of the wire receiving opening formed by the V-shaped notches in the blades will remain in a predetermined position regardless of any adjustments made to the blades to alter the size of the wire receiving opening, thus further assuring that a uniform cutting action will be applied by the angular cutting edges of the blades regardless of the size of the insulated wire which is inserted on center into the wire receiving opening.

BRIEF DESCRIPTION OF THE DRAWINGS

FIGS. 3 and 4 are perspective views showing the front and rear sides of one of the insulation cutting blades utilized in the device;

FIG. 5 is a vertical sectional view taken along line 5—5 of FIG. 1 showing the blades in their open position;

FIG. 6 is a sectional view similar to FIG. 5 showing the blades in their insulation cutting position; and FIG. 7 is a perspective fragmentary exploded view showing an alternative form of one pair of the cutting blades and the end of the pivoted arm which carries the blades.

DESCRIPTION OF THE PREFERRED EMBODIMENTS

Figure 1:
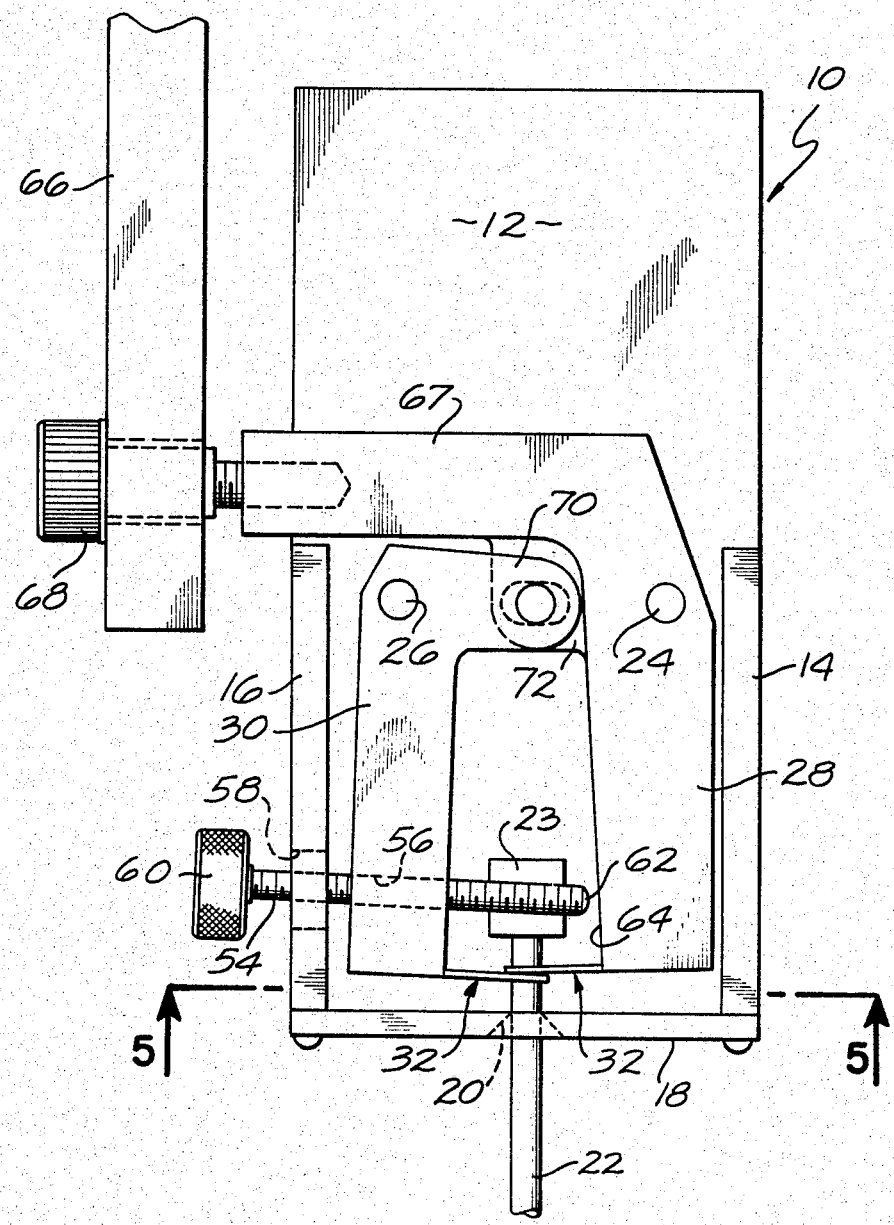
FIG. 1 is a top plan view of the wire stripping device of the present invention with the blades shown in their maximum open position.
Figure 2:
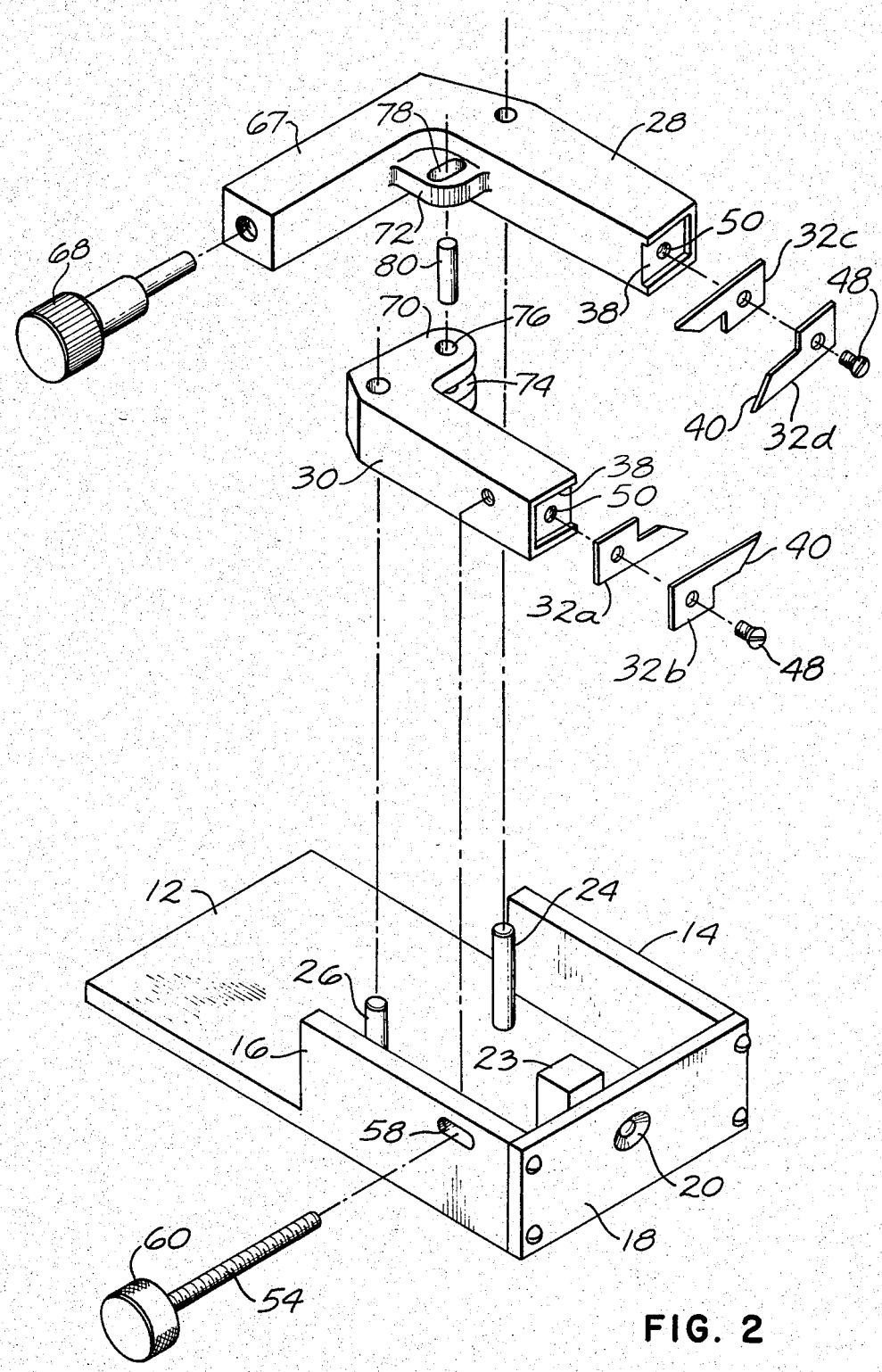
FIG. 2 is an exploded, perspective view of the device illustrated in FIG. 1.

Referring now to FIGS. 1-6 in detail, the wire stripping device of the present invention, generally designated 10, comprises a flat base 12 having a pair of upstanding sidewalls 14 and 16 running along two sides of the base. A plate 18 is mounted on the front of the base. A conical guide hole 20 is formed in the plate for guiding an insulated wire 22 into the stripping device. An adjustable wire stop 23 is mounted on the base behind the plate 18 for controlling the distance that the wire may be inserted into the stripping device and, hence, the length of insulation to be stripped from the wire.

Two upstanding pivot pins 24 and 26 are fixedly mounted on the base behind the plate 18. A generally L-shaped arm 28 is pivotably mounted on the pin 24. A second arm 30 is pivotably mounted on the pin 26.

Insulation cutting blades are mounted on the forward ends of the arms 28 and 30 adjacent to the plate 18. In accordance with one feature of the invention, four identical blades 32 are provided, two of such blades being mounted on the end of each of the pivot arms. As best seen in FIGS. 3 and 4, each blade 32 has an enlarged square mounting portion 34 having a hole 36 formed in the center thereof. The square mounting portion 34 of the blade is dimensioned to fit within a rectangular recess 38 formed in the end of each pivot arm. An angular cutting edge 40 is formed on the end of the blade 32. The cutting edge extends at an angle of 45° with respect to the upper edge 42 of the blade, which when mounted on one of the arms 28 or 30, lies parallel to the surface of the base 12 and perpendicular to the pivot pins 24 and 26. The cutting edge of the blade is defined by a flat surface 44 on one side of the blade and a beveled surface 46 formed on the opposite side of the blade. The four blades illustrated in FIGS. 2, 5 and 6 utilized in the wire stripping device of the invention will be designated 32a, 32b, 32c and 32d. The blades 32a and 32b are reversed relative to each other with the square mounting portion of the blade 32b overying the other. The depth of the recess 38 in the end of the arm 30 is sufficient to receive the mounting portions of both of the blades. The blades 32a and 32b are reversed relative to each other so that their flat surraces 44 back up to each other whereby the beveled surfaces 46 on the respective blades 32a and 32b face in the opposite directions. It will be seen that the angular cutting edges 40 of the blades 32a and 32b form a V-shaped notch. The blades 32a and 32b are retained in the recess 38 in the end of the arm 30 by a screw 48 which extends through the holes 36 in the two blades and is threaded into a hole 50 centrally located in the recess 38.

The blades 32c and 32d are mounted in the recess 38 in the end of the arm 28 by a screw 48 in a similar fashion as the blades 32a and 32b, with the flat surfaces 44 of the two blades backing up to each other. The beveled surface 46 on the forward blade 32d is opposite to the beveled surface on the forward blade 32b, and the beveled surface on the blade 32c is opposite to the beveled surface on the blade 32a. The angular cutting edges of the blades 32c and 32d also form a V-shaped notch. The ends of the blades 32b and 32d adjacent to their cutting edges overlap the ends of the other two blades 32a and 32c so that the flat surfaces 44 on the four blades lie generally in a common plane. The plane is somewhat arcuate when the pivot arms 28 and 30 are in their open position as illustrated in FIG. 1. However, the plane becomes straight when the forward ends of the arms are pivoted together to their cutting position illustrated in FIG. 6. Whether the blades are in their open position as shown in FIG. 5 or in their cutting position as illustrated in FIG. 6, the opening 52 formed by the V-shaped notches in the two pairs of blades on the arms has a square configuration.

The size of the opening 52 may be changed by rotating an adjusting screw 54 which is threaded through a lateral opening 56 in the arm 30. The screw extends through an elongated slot 58 formed in the sidewall 16. By rotating the head 60 on the outer end of the screw 54, the distance between the inner end 62 of the screw and the inner surface 64 of the arm 28 may be adjusted, thus allowing the extent of pivotable movement of the arms 28 and 30 toward each other to be altered and, consequently, the size of the opening 52 adjusted to accommodate different size insulated wires 22.

Because the flat surfaces 44 of the four insulation cutting blades lie essentially in a common plane and the beveled surfaces 46 of the blades 32b and 32d which are opposite to each other face in one direction while the beveled surfaces of the blades 32a and 32c which are opposite to each other face in the opposite direction, the cutting edges of the blades around the wire receiving opening 52 may be considered to be "balanced" so that equal surfaces on the front and back of the blades, and hence equal forces, will act upon the insulation on the wire 22. Thus, when the insulation is cut by the blades and the base 12 is moved rearwardly (in the upward direction as viewed in FIG. 1), the insulation will be pulled off the wire evenly, avoiding the possibility of wire skiving and leaving the stripped wire straight.

The ends of the arms 28 and 30 which carry the insulation cutting blades are caused to pivot relative to each other by an actuating element 66 which is attached to the leg 67 of the L-shaped blade 28 by a fastener 68. The actuating element 66 extends in the same direction as a track, not shown, on which the base 12 is slidable. The actuating element may be operated by a double acting air cylinder or the like, not shown.

A lateral extension 70 is formed on the arm 30 adjacent to the pivot pin 26. A like extension 72 is formed on the arm 28 which slidably fits into a lateral slot 74 formed in the extension 70. A vertical opening 76 extends through the bifurcated extension 70 which is aligned with an elongated slot 78 in the extension 72. A pin 80 is press fit in the opening 76 and slidable in the slot 78. The pin 80 is mounted midway between the pivot pins 24 and 26 and the three pins lie on a substantially straight line which is parallel to the plate 18. The pin 80 is slidable in the slot 78 which is elongated in the direction toward the pins 24 and 26 so that there is a lost motion connection between the pivot arms 28 and 30.

The center of the conical guide hole 20 in the plate 18 on the front of the device, the center C of the wire receiving opening 52, and the pin 80, lie in a substantially straight line which is perpendicular to the line passing through the pivot pins 24 and 26.

When the actuating element 66 is shifted rearwardly, or upwardly as viewed in FIG. 1, the arm 28 will be caused to pivot in a clockwise direction around the pin 24 causing the forward end of the arm which carries the blades 32c and 32d to move inwardly. Simultaneously, the forward end of the arm 30 carrying the blades 32a and 32b will move inwardly due to the interconnection between the extensions 70 and 72 on the arms via the pin 80 in slot 78. Thus, the pivot arms shift simultaneously to cause the two sets of blades on the ends of the arms to move inwardly toward the wire 22 which is inserted through the guide hole 20 into the opening 52 between the blades whereby the insulation on the wire will be cut. When the actuating element is shifted rearwardly, the base 12 will slide rearwardly on its track. Rearward movement of the base 12 on the track by the actuating element 66 strips the cut insulation from the wire without skiving. Because both arms which carry the blades move together in unison toward a central axis, namely the axis which extends through the center C of the wire receiving opening 52, the blades will close on center regardless of the size of the opening 52 which is determined by the adjusting screws 54. This can be appreciated by examination of FIG. 6 which shows the blades in their cutting position. In order to open the blades, the actuating element 66 is shifted in the forward direction causing the forward ends of the pivot arms 28 and 30 to spread apart.

From the foregoing, it will be appreciated that by the present invention there is provided a wire stripping device in which the opposite blades of the two pairs of blades have equal facial surfaces engaging the insulation on the wire which assures equal forces will be applied to the wire when the insulation is removed therefrom thereby avoiding skiving of the wire, and leaving the stripped wire straight. Thus, the wire can be properly inserted into the crimp barrel of an electrical contact on the axis of the barrel, thereby assuring that an effective crimp will be made. Furthermore, by the lost motion interconnection between the lever shaped pivot arms of the stripping device, the forward ends of the two arms will move simultaneously toward the center axis on which the wire to be stripped is mounted, regardless of the size of the wire receiving opening 52, and the cutting edges of the blades will simultaneously engage the surface of the insulation on the wire at four equally spaced locations around the surface of the insulation thereby assuring a uniform cutting of the insulation, as well as a straight cut of the insulation so that the end of the insulation will be perpendicular to the axis of the wire.

Reference is made to FIG. 7 of the drawings which shows a modified form of the insulation cutting blades of the invention and how they may be mounted on the end of a pivot arm. The blades 90 and 92 are similar to the blade 32 except that they do not embody the square mounting portion 34 of the blade 32. The elongated blades 90 and 92 are formed with individual screw receiving holes 94. The end of the pivot arm 96 has a stepped configuration providing an outer surface 98 and a recessed inner surface 100. The depth of the recess is equal to the thickness of the blade 90. The blade 92 is mounted with its flat surface engaging the surface 98 of the arm 96 so that its beveled surface 102 adjacent to the cutting edge 104 faces forwardly. The blade 90 is identical to the blade 92, and reversed so that its flat surface faces forwardly rather than rearwardly, and its beveled surface 102 faces rearwardly in the direction opposite to the beveled surface on the blade 92. By this arrangement, the flat surfaces of the blades 90 and 92 lie in the common plane in a fashion similar to the blades utilized in the first embodiment of the invention disclosed herein. Separate screws 106 extend through the openings 94 in the blades 90 and 92 for threading into corresponding openings 108 in the end of the arm to affix the blades to the arm. A similar set of blades are mounted on the end of a second arm, not shown, in a reverse arrangement so that the angular cutting edges of the ends of the blades provide a balanced arrangement in the same manner as the blades utilized in the first embodiment of the invention.

In the event the insulation on the wire being stripped is relatively hard, it may be desirable to provide a detent arrangement (now shown) between the base 12 and its track which will allow the force applied by the actuating element 66 to be initially imprinted solely to the pivoted arms so that a high cutting force will be produced on the cutting blades. After the insulation is cut the detent will be overcome allowing the base 12 to slide rearwardly on the track to strip the insulation from the wire.

What is claimed is:

1. A device for stripping insulation from a wire comprising:
    first and second arms movable toward and away from each other;
    means supporting said arms;
    first and second insulation cutting blades on one of said arms providing a first pair of blades and third and fourth insulation cutting blades on the other of said arms providing a second pair of blades;
    each said blade having and a generally straight cutting edge defined by a flat surface on one side of said blade and a beveled surface on the opposite side of said blade intersecting said flat surface, said cutting edge extending at an angle across said blade;
    the cutting edges of said blades of each said pair forming a V-shaped notch, the V-shaped notches of said pairs of blades facing each other to form a wire receiving opening;
    said flat surfaces of said four blades lying generally in a common plane;
    the beveled surfaces of said first and third blades being opposite to each other and both facing in one direction relative to said plane; and
    the beveled surfaces of said second and fourth blades being opposite to each other and both facing in the opposite direction relative to said plane.

2. A device as set forth in claim 1 wherein:
said first and third blades overlap said second and fourth blades.

3. A evice as set forth in claim 1 wherein:
said four blades are identical.

4. A device as set forth in claim 1 wherein:
said arms are pivoted relative to each other adjacent to one end thereof;
said cutting blades are mounted on the ends of said arms opposite to said one end;
first means is provided for adjusting the size of said wire receiving opening; and
second means interconnects said arms for maintaining the center of said opening at a predetermined position regardless of the size of said opening.

5. A device for stripping insulation from a wire comprising:
    a base having a pair of fixed, parallel pivot pins thereon;
    a pair of arms each being pivotable around a corresponding one of said pivot pins;

each said arm having an extension adjacent to its pivot pin extending laterally toward the pivot pin for the other arm;

insulation cutting blades mounted on the ends of said arms remote from said extensions;

said blades having notches therein facing each other to form a wire receiving opening; and interconnection means between said extensions allowing said remote ends of said arms, and hence said blades, to be shifted either toward or away from each other simultaneously, said interconnection means comprising a pin on one of said extensions slidable in an elongated slot in the other extension.

6. A device as set forth in claim 5 wherein:

said third pin is midway between said pivot pins for said arms, said three pins lying on a substantially straight line; and said wire receiving opening is substantially equidistant from said pivot pins for said arms.

7. A device as set forth in claim 6 including:

means defining a wire receiving guide hole in front of said blades substantially aligned with said third pin and said wire receiving opening.

8. A device for stripping insulation from a wire comprising:

first and second arms movable toward and away from each other;

means supporting said arms;

first and second insulation cutting blades on one of said arms providing a first pair of blades and third and fourth insulation cutting blades on the other of said arms providing a second pair of blades;

each said blade having and a generally straight cutting edge defined by a flat surface on one side of said blade and a beveled surface on the opposite side of said blade intersecting said flat surface, said cutting edge extending at an angle across said blade;

the cutting edges of said blades of each pair forming a V-shaped notch, the V-shaped notches of said pairs of blades forming each other to form a wire receiving opening;

said flat surfaces of said four blades lying generally in a common plane;

the beveled surfaces of said first and third blades being opposite to each other and both facing in one direction relative to said plane;

the beveled surfaces of said second and fourth blades being opposite to each other and both facing in the opposite direction relative to said plane;

said arms being pivoted relative to each other adjacent to one end thereof;

said cutting blades being mounted on the ends of said arms opposite to said one end;

means provided for adjusting the size of said wire receiving opening;

means interconnecting said arms for maintaining the center of said opening at a predetermined position regardless of the size of said opening;

a pair of pivot pins for said arms;

said interconnecting means including a third pin between said pivot pins for said arms, said three pins lying in substantially a straight line;

means defining a wire receiving guide hole in front of said blades; and said hole, said wire receiving opening and said third pin lying on a substantially straight line perpendicular to said firstmentioned line.

9. A device for stripping insulation from a wire comprising:

first and second arms movable toward and away from each other;

means supporting said arms;

first and second insulation cutting blades on one of said arms providing a first pair of blades and third and fourth insulation cutting blades on the other of said arms providing a second pair of blades;

each said blade having and a generally straight cutting edge defined by a flat surface on one side of said blade and a beveled surface on the opposite side of said blade intersecting said flat surface, said cutting edge extending at an angle across said blade;

the cutting edges of said blades of each said pair forming a V-shaped notch, the V-shaped notches of said pairs of blades facing each other to form a wire receiving opening;

said flat surfaces of said four blades lying generally in a common plane;

the beveled surfaces of said first and third blades being opposite to each other and both facing in one direction relative to said plane; and the beveled surfaces of said second and fourth blades being opposite to each other and both facing in the opposite direction relative to said plane;

said supporting means comprising a base having a pair of parallel pivot pins thereon;

each of said arms being pivotable around a corresponding one of said pivot pins;

each said arm having an extension adjacent to its pivot pin extending laterally toward the pivot pin for the other arm;

said pairs of blades being mounted on the ends of said arms remote from said extensions; and interconnection means between said extensions allowing said remote ends of said arms, and hence said pairs of blades, to be shifted either toward or away from each other simultaneously.

10. A device as set forth in claim 9 wherein:

said interconnection means comprises a third pin on one of said extensions slidable in a slot in the other extension.

11. A device as set forth in claim 10 wherein:

said third pin is midway between said pivot pins for said arms, said three pins lying on a substantially straight line; and said wire receiving opening is substantially equidistant from said pivot pins for said arms.

12. A device as set forth in claim 11 including:

means defining a wire receiving guide hole in front of said blades substantially aligned with said third pin and said wire receiving opening.

13. A device for stripping insulation from a wire comprising:

a support;

a pair of fixed, parallel pivot pins mounted on said support;

first and second arms each pivotably mounted adjacent to one end thereof on a corresponding one of said pivot pins;

insulation cutting blades mounted on said arms adjacent to the ends thereof opposite to said end;

said blades having V-shaped notches therein facing each other to form a wire receiving opening;
means for adjusting the size of said opening; and
means other than said adjusting means for interconnecting said arms for maintaining the center of said opening at a predetermined position regardless of the size of said opening;
said interconnecting means including a third pin between said pivot pins for said arms, said three pins lying in substantially a straight line;
means defining a wire receiving guide hole in front of said blades; and
said hole, said wire receiving opening and said third pin lying on a substantially straight line perpendicular to said first-mentioned line.

* * * * *